J. T. LAWSON.
POTATO DIGGER.
APPLICATION FILED JAN. 2, 1917.

1,235,208.

Patented July 31, 1917.

WITNESS:
Leo J. Griffin.

INVENTOR,
James T. Lawson,
BY Allen & Daggett,
ATTORNEYS.

UNITED STATES PATENT OFFICE.

JAMES T. LAWSON, OF ROCKLAND, MASSACHUSETTS.

POTATO-DIGGER.

1,235,208. Specification of Letters Patent. Patented July 31, 1917.

Application filed January 2, 1917. Serial No. 140,040.

*To all whom it may concern:*

Be it known that I, JAMES T. LAWSON, a citizen of the United States, residing at Rockland, in the county of Plymouth, in the State of Massachusetts, have invented a certain new and useful Improvement in Potato-Diggers, of which the following is a specification, reference being had to the accompanying drawings.

The object of this invention is to provide an inexpensive, but very effective, device for attachment to ordinary potato forks, by means of which a hill of potatoes may be dislodged and brought to the surface of the ground with a single easy movement of the device and without injury to the potatoes.

Figure 1:
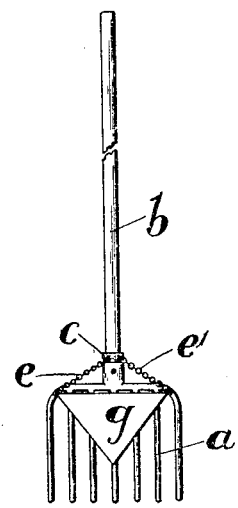
Figure 2:
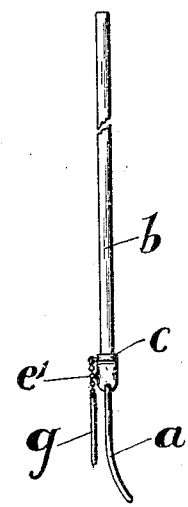
Figure 3:
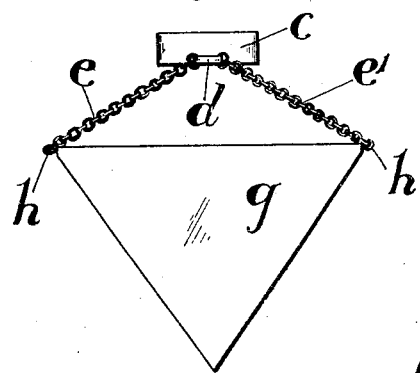
Figure 4:
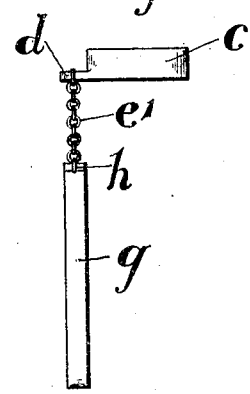
Figure 5:
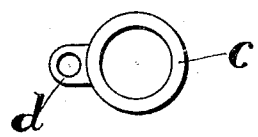

My invention is illustrated in the annexed drawings, Figure 1 of said drawings being a rear view of a fork having attached thereto my present improvement, and Fig. 2 is a side view of the same. Fig. 3 is a relatively enlarged rear view of said attachment; Fig. 4 is a side view of the same, and Fig. 5 is a plan view of the collar $c$ by means of which the attachment is mounted on the fork handle.

Briefly described, my improvement consists of a special form of fulcrum by means of which the fork may be very easily pried from the ground, with its load of potatoes, thus eliminating the back-aching labor necessary when using the ordinary form of fork and also, as I will explain more fully hereinafter, preventing the stabbing or grazing of the potatoes.

Referring to the drawings, the letter $a$ indicates a potato fork of ordinary construction, and $b$ denotes its handle.

My improved device is supported on the said fork by means of a collar $c$ which is loosely mounted on the handle and is formed with a laterally extending eye $d$. Attached to the said eye are two chains $e$—$e'$ whose lower ends are attached to two corners of a triangular plate $g$, the arrangement being such that the said plate is suspended loosely from the chains with the apex of the triangle at the bottom. The chains may be connected to the plate by any practical means but I have illustrated here eye-bolts $h$, in the two angles of the triangle, to which the chains are connected.

It will now be understood that my new device is of such a construction that it may be attached to ordinary forks by simply slipping the collar $c$ down on the fork handle until the collar rests loosely upon the fork; the triangular plate $g$ being thus suspended so it is entirely free to swing like a plumb bob whenever the fork is in use. In the event that the collar $c$ is to be used with a fork-handle which has a hand-grip at its upper end the said collar may be formed of two parts which may be clasped around the fork handle and then secured together by means of screws or bolts.

When it is desired to use a fork having my described improvement attached thereto, the tines of the fork are set into the ground at little distance to one side of the hill of potatoes; the fork handle being held in approximately a vertical position as the tines are forced into the ground. The handle and fork are then rocked forward, thus opening a hole into which the loosely suspended plate $g$ drops by gravity. The handle is then rocked backward and, as the plate $g$ then serves as a substantial fulcrum, the tines of the fork are easily rocked upward to the surface of the ground, carrying with them every potato in the hill and with no tendency to bruise or puncture said potatoes.

One of the important and desirable results of utilizing my described device is in the fact that the operator can maintain an upright position all the time, and a further advantage is in the fact that very little force need be exerted in raising the fork up with its load of potatoes, as the plate $g$ operates as a broad flat fulcrum against the otherwise soft, yielding, earth, to prevent the rearward movement of the fork.

My described device may be cheaply manufactured, it is practically indestructible, and it may be readily attached to forks as now commonly constructed.

Having thus described my invention, and the manner in which it is used, I claim as new and wish to secure by Letters Patent:—

In combination, with a potato fork, a triangular, plate-like fulcrum located at the rear side of the tines of said fork, and means consisting of a collar loosely fitted on the fork handle and flexible connections between said plate and collar for suspending said plate.

JAMES T. LAWSON.

Copies of this patent may be obtained for five cents each, by addressing the "Commissioner of Patents, Washington, D. C."